United States Patent [19]
Dennis

[11] 3,986,580
[45] Oct. 19, 1976

[54] SOLID STATE ENERGY STORAGE

[76] Inventor: Clifford E. Dennis, 14 Hamburg Turnpike, Hamburg, N.J. 07419

[22] Filed: Apr. 7, 1975

[21] Appl. No.: 565,445

[52] U.S. Cl. .................................. 185/9; 185/13
[51] Int. Cl.² ........................................ F03G 1/00
[58] Field of Search .............. 185/9, 10, 11, 13, 37, 185/39, 40 R, 43

[56] References Cited
UNITED STATES PATENTS

| | | | |
|---|---|---|---|
| 481,714 | 8/1892 | Lang et al. ............................. | 185/9 |
| 779,382 | 1/1905 | Teel ....................................... | 185/9 |
| 837,815 | 12/1906 | Esch ...................................... | 185/9 |
| 1,673,197 | 6/1928 | Kollmann .............................. | 185/9 |

*Primary Examiner*—Allan D. Herrmann

[57] ABSTRACT

A large gear runs free on a drive shaft rotated by any power source. To this large gear a metal strip is rigidly attached, radial to the drive shaft but not touching the drive shaft. At distances apart on the strip the ends of springs are securely attached. The other ends of the springs are attached at the same distance from the drive shaft to an adjacent strip likewise free running on the drive shaft. Similar strips running free on the drive shaft are attached by springs similarly and adjacently to each other, so that the springs take the form of concentric circles around the drive shaft and are prevented from seeking the center by the radial strips. The last strip, farthest from the large gear, is attached rigidly to the drive shaft. The large gear is firmly braked, so that power applied to the drive shaft stores energy in the elongated springs. The stored energy may be drawn off and used by releasing the brake. The elongation of the springs beyond their elastic limit is prevented by powerfully restraining movement beyond a certain point by a metallic chain or other well-known variable distance control devices.

2 Claims, 1 Drawing Figure

U.S. Patent  Oct. 19, 1976  3,986,580
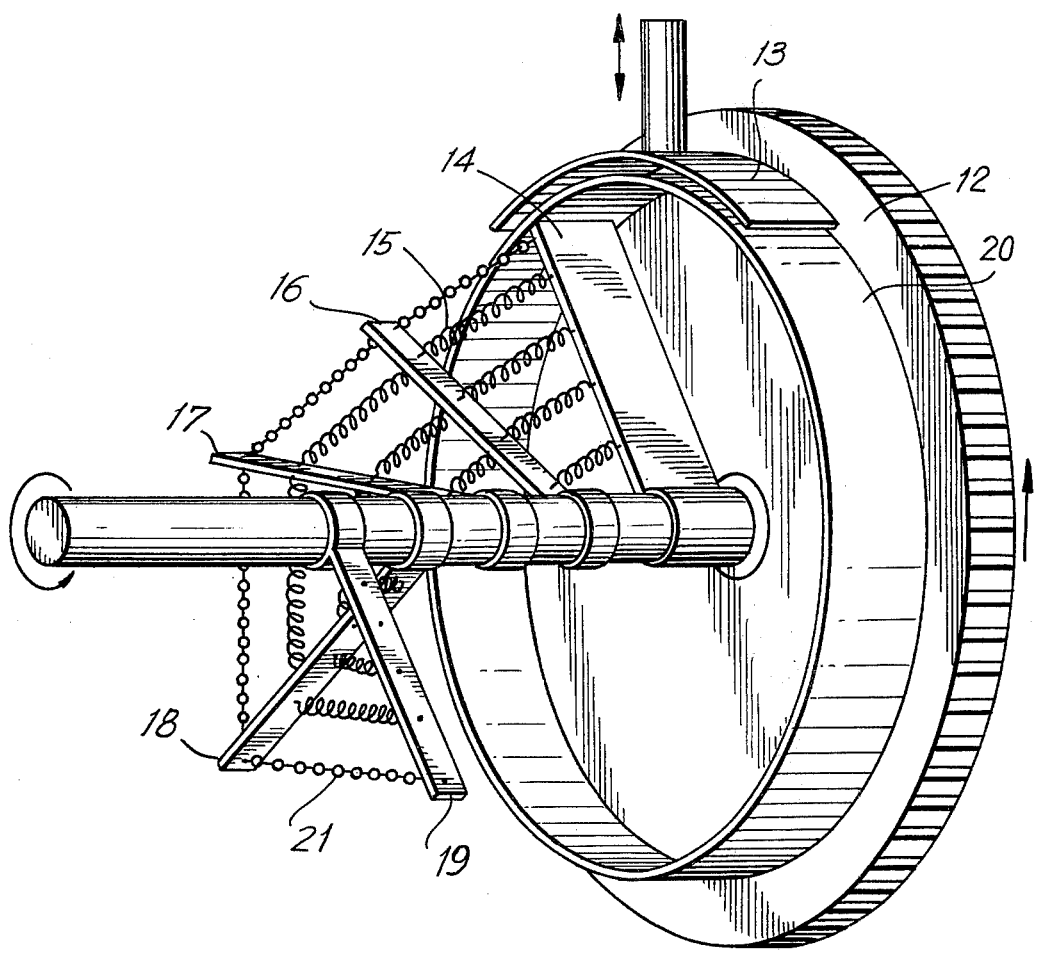

SOLID STATE ENERGY STORAGE

BACKGROUND OF THE INVENTION

1. Field of the Invention

This invention relates generally to energy storage, and particularly to solid state energy storage for utilizing its excellent features, such as ease of control, ability to meet peak loads, giving constant energy flow from variable power input and for other uses as, for instance, in mechanical transmissions.

2. Description of Prior Art

Solid state storage units are known which supply energy in small amounts. I have found none which store energy in theoretically limitless amounts.

SUMMARY OF THE INVENTION

Through experimentation I have found that a device may be constructed in the solid state which will store energy in an immediately usable state, and in theoretically limitless amounts.

This is accomplished by placing a large gear free running on the drive shaft of an engine or motor of any type, holding it firmly by a brake and connecting it through a series of springs, even hundreds of them, held in place by free running strips on the drive shaft and concentric with the drive shaft, to a final strip rigid with the drive shaft. As power is applied to the drive shaft, power is stored in the elongated springs, kept in position with rotative pull by the radial strips. The tension on the springs is kept within the elastic limits by chains or other restraint on the ends of the metal strips.

DRAWINGS

These objects and advantages as well as other objects and advantages are attained by the device shown by way of illustration in the drawing in which the FIGURE is the view along the drive shaft of the energy storage unit.

PREFERRED EMBODIMENT

Referring now to the drawings in detail, there is provided a drive shaft 11. A large gear 12 runs free on the drive shaft 11 and is held firmly by a brake 13. Rigidly attached to this large gear is a metallic strip 14 to which one end of a spring, or springs 15 at various distances from the drive shaft are securely attached. The spring or springs are then attached to the adjacent strip 16 which is free running on the drive shaft. The spring or springs are then securely attached to the next adjacent free-running strip 17. The spring or springs are then securely attached to the next adjacent free-running strip 18 and then to the strip 19 which is bound rigid with the drive shaft 11. As the drive shaft rotates (as illustrated in this case clockwise, or counter clockwise if so planned and constructed) the strip 19 rotates with it elongating and storing energy in the springs. This energy is released as desired by releasing the brake 13 working on brake band 20. As illustrated in this figure the elongation of the springs is kept within their elastic limits by a very flexible chain 21 joining the ends of the strips. Other well known devices may be used for this purpose.

I claim:

1. A solid state energy storage system comprising:
  a. a large gear running free on the drive shaft of an engine or motor.
  b. a brake to hold the gear firmly in place or to release the gear,
  c. a series of metal strips adjacent to the gear and running free on the drive shaft,
  d. a series of springs connecting the gear and the strips in adjacent order,
  e. a series of springs concentric with the drive shaft which, when elongated, exert force to rotate the gear,
  f. said series of metal strips free running on the drive shaft to prevent the springs from seeking the center as they are put under tension,
  g. the last strip, the strip farthest from the gear, rigid with the drive shaft, rotates with the drive shaft and energy is stored in the elongated springs.

2. A solid state energy storage unit according to claim 1,
  a. a flexible, non entangling type chain securely attached to adjacent strips to hold springs within their elastic limits as they are elongated.

* * * * *